United States Patent
Ko et al.

(10) Patent No.: US 7,712,101 B2
(45) Date of Patent: May 4, 2010

(54) METHOD AND APPARATUS FOR DYNAMIC ALLOCATION OF RESOURCES TO EXECUTING THREADS IN A MULTI-THREADED PROCESSOR

(75) Inventors: Yin Nam Ko, London (GB); Robert Graham Isherwood, Bucks (GB)

(73) Assignee: Imagination Technologies Limited, Hertfordshire (GB)

( * ) Notice: Subject to any disclaimer, the term of this patent is extended or adjusted under 35 U.S.C. 154(b) by 1559 days.

(21) Appl. No.: 10/949,958

(22) Filed: Sep. 24, 2004

(65) Prior Publication Data
US 2005/0235126 A1   Oct. 20, 2005

(30) Foreign Application Priority Data
Apr. 16, 2004   (GB)   ................. 0408553.6

(51) Int. Cl.
*G06F 9/46*   (2006.01)
(52) U.S. Cl. ....................... 718/104; 718/103
(58) Field of Classification Search ................. 718/104, 718/103
See application file for complete search history.

(56) References Cited

U.S. PATENT DOCUMENTS

| 5,777,628 | A | * | 7/1998 | Buck-Gengler | ............. 345/474 |
|---|---|---|---|---|---|
| 5,968,167 | A | | 10/1999 | Whittaker et al. | |
| 6,324,616 | B2 | | 11/2001 | Chrysos et al. | |
| 7,574,567 | B2 | * | 8/2009 | Wyman | ...................... 711/141 |
| 2003/0028581 | A1 | | 2/2003 | Kosanovic | |
| 2005/0134745 | A1 | * | 6/2005 | Bacche et al. | ............... 348/702 |

FOREIGN PATENT DOCUMENTS

| GB | 2 321 543 | 7/1998 |
|---|---|---|
| GB | 2 372 350 | 8/2002 |
| WO | WO 01/48599 | 7/2001 |

OTHER PUBLICATIONS

Search Report dated Aug. 16, 2004 in United Kingdom Application No. GB 0408553.6 (6 pages).

* cited by examiner

*Primary Examiner*—Meng-Ai An
*Assistant Examiner*—Camquy Truong
(74) *Attorney, Agent, or Firm*—Flynn, Thiel, Boutell & Tanis, P.C.

(57) ABSTRACT

A method and apparatus are provided for dynamically allocating an access bandwidth for one or more resources to threads of a multithreaded processor. The allocation is performed by providing an execution based metric for each thread and providing an access to the resource in dependence on the execution based metrics of the threads. In addition, or alternatively, a resource based metric can be determined and the access to the resource is provided in dependence on the resource based metric.

7 Claims, 7 Drawing Sheets

(PRIOR ART)

Figure 1 – A Typical Memory Interfaces Arrangement of a Multi-threaded Microprocessor Figure 2 – Architecture of the Proposed Memory Pre-arbiter Figure 4 – AMA Metric Extraction Figure 5-Overall Metric Generation Figure 6 – Arbitration Block Figure 7 – Thread Metric Circular Shifting ＃ METHOD AND APPARATUS FOR DYNAMIC ALLOCATION OF RESOURCES TO EXECUTING THREADS IN A MULTI-THREADED PROCESSOR

FIELD OF THE INVENTION

This invention relates to a method and an apparatus for dynamically allocating an access bandwidth for one or more resources, such as memory, to threads of a multi-threaded microprocessor. In the case of a memory access, this improves the memory latency and, in particular, avoids the overloading of an automatic MIPS allocation (AMA) control system during intensive memory activity.

BACKGROUND OF THE INVENTION

British patent application no. 9607153.5 describes a multi-threaded processor and data processing management system in which a plurality of execution threads are routed between a plurality of data inputs and a plurality of data outputs via data processing means. The data processing means has an access to data storage means. The system repeatedly determines which routing operations and which data processing operations are capable of being performed and commences execution of at least one of the routing or data processing operations on each clock cycle.

Figure 1:
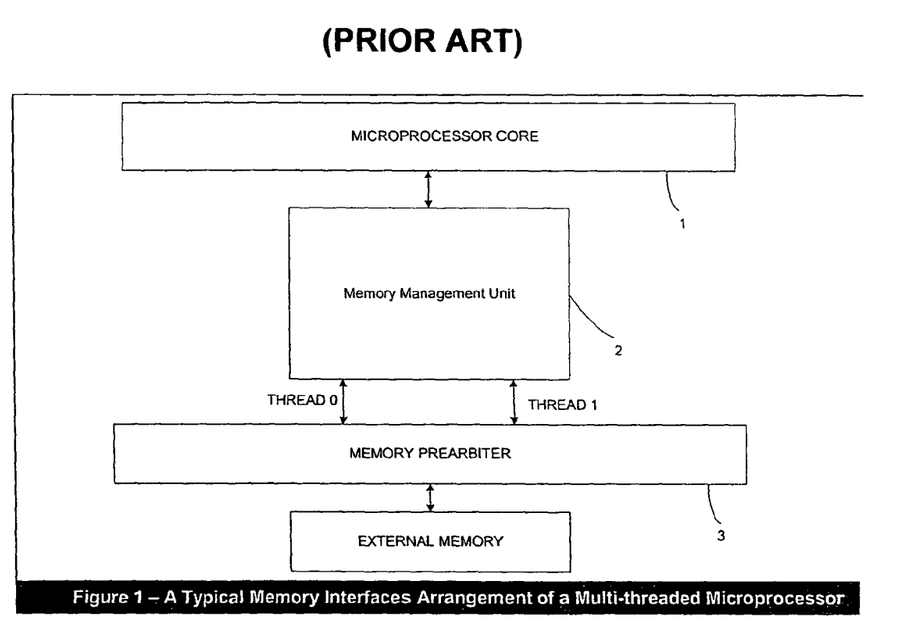
FIG. 1 shows the typical sub-modules for a multi-threaded processor discussed above.

The typical sub-modules for such a multi-threaded processor is shown in FIG. 1. For the purposes of this example the microprocessor core in this figure has only two execution threads.

The microprocessor core 1 issues memory requests to the memory management unit 2. When the required data is not in its local memory (i.e., a cache miss), the required data would have to be fetched from the external memory. Since the external memory has only a single data path, the memory prearbiter 3 is used for arbitrating between requests from different threads.

The simplest kind of arbitration scheme that can be used in FIG. 1 is round-robin. However, there are two main problems with such a scheme. These are as follows:

Firstly, conventional dynamic random access memories (DRAM) are organized into banks. These banks are divided into regions called pages. Generally speaking, before a location of the memory can be accessed, the relevant page has to be opened. After the access, the memory may choose to keep the current page open (open page policy) or closed (close page policy). For example, if the memory is operating on the open page policy and the pre-arbiter chooses to send a memory access which is not in the same page as the last access, a high memory cycle latency will result due to the amount of time needed to open a new page. On the other hand, if the memory is operating on the close page policy, sending a memory request in the same page as the last access would similarly result in a high latency.

Secondly, the AMA of the multi-threaded processor addresses the problem of controlling the use of processor resources such that processing requirements of all programs running on all threads are to be met. The arbitration scheme of FIG. 1 does not take into account the current status of the threads. Thus, it is possible that the operation of the AMA could be impeded. In particular, when there are periods of intense memory activity, the AMA control system could be overloaded simply due to the fact that the prearbiter 3 does not have any thread AMA information.

SUMMARY OF THE INVENTION

Preferred embodiments of the present invention seek to optimize the memory latency in situations where more than one thread is requesting memory access. To achieve this, a register is used to store the page address of the last memory access accepted by the memory. For each access of each thread at the arbiter input, the respective page addresses are calculated and compared with the page address held in the register storing the page address of the last memory access. This comparison can then be used to produce an in-page indication. In-page metrics of the various threads are then derived by multiplying the in-page indication with a user-defined weight, allowing user control over the in-page optimization of memory accesses between different threads. Note that the memory with both open and close page policy could be optimized.

To solve the second problem, a preferred embodiment generates another metric called the AMA metric. Firstly a subset of the AMA delay count and deadline count values is taken. These values are manipulated to produce the AMA metric. The subset for each thread of each count is individually selectable by the user to provide control of the extent of the AMA status that should affect the arbitration of memory accesses.

Preferred embodiments enable these two metrics to be either used individually or together in combination with a status thread priority to affect the thread access to the memory.

BRIEF DESCRIPTION OF THE DRAWINGS

Preferred embodiments of the invention will now be described in detail by way of example with reference to the accompanying drawings in which.

DETAILED DESCRIPTION OF PREFERRED EMBODIMENTS

Figure 2:
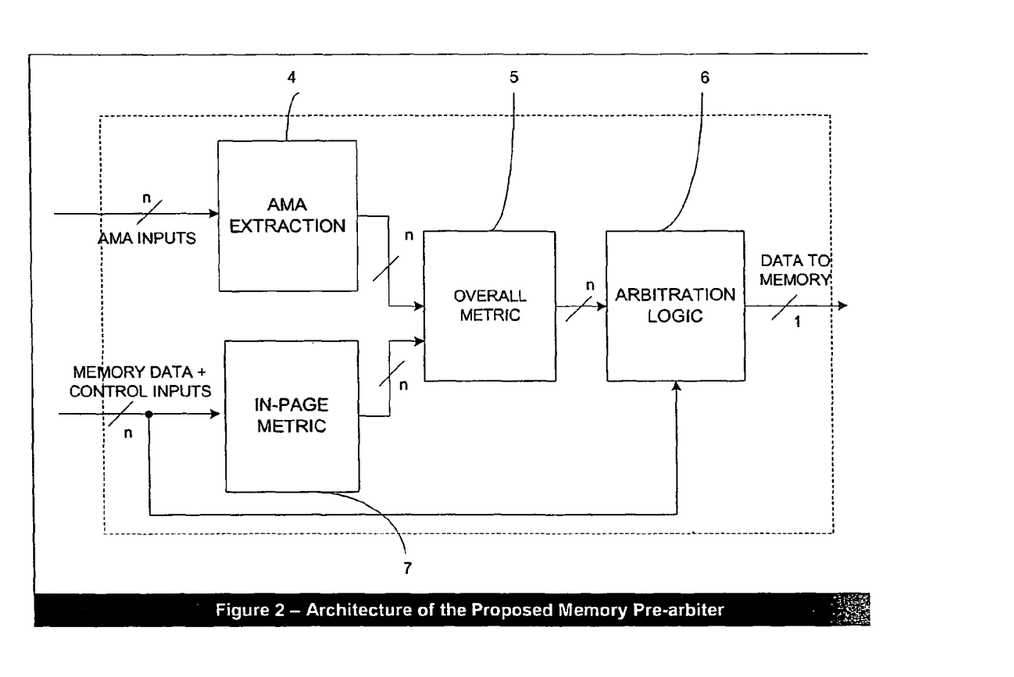
FIG. 2 shows schematically the architecture of a memory prearbiter embodying the invention.

FIG. 2 shows schematically a memory prearbiter 1. This comprises an AMA extraction unit 4 receiving AMA inputs for each thread and, in parallel, an in-page metric generation unit 7 which receives memory data and control inputs for each thread. The results of the AMA extraction unit 4 and the in-page metric generation unit are supplied to an overall metric generation unit 5 and then to an arbitration logic 6 that determines which thread should have access to the memory and provides this access at its output. The arbitration logic 6 is also coupled to the memory data and control inputs for each thread to pass the data to the memory via its output.

The AMA extraction unit 4 performs subset selection manipulation and concatenation of various AMA counts into AMA metrics for each thread. The in-page metric generation block 7 performs storage of the last memory page address and comparison with the page address of the input request and the necessary manipulation to give the in-page metrics. Normally the manipulation simply comprises a multiplication.

The overall metric generation unit 5 includes all the logic needed to produce an overall metric for each thread for use by the arbitration logic 6 to derive its final thread decision. When threads are executing on the multi-threaded processor, each thread will provide AMA inputs, memory data and control inputs to the memory prearbiter which will then extract the AMA metrics and in-page metrics to produce the overall metric used by the arbitration logic that determines which thread should have access to the memory. The invention could be modified so that only the AMA metrics, in-page metrics, or static thread priority is used to determine which thread has access to memory.

Figure 3:
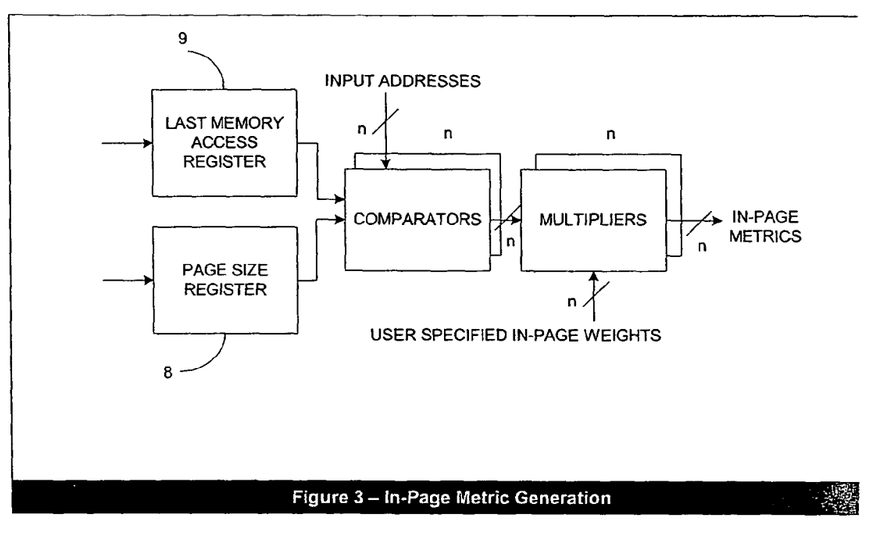
FIG. 3 shows schematically the implementation of in-page metric generation in an embodiment of the invention.

FIG. 3 shows the implementation of the in-page metric block for N number of threads. A last memory access register 9 is provided to store the memory address of the last memory transaction sent to the external memory by the arbitration logic 6 in FIG. 2. A page size register 8 stores a fixed number representing the size of a page in bytes in the memory being accessed. N comparators 16 are provided, one for each thread. Each of the comparators makes use of the value stored in the page size register 8 to compute from the input addresses the page address required by each thread. This is then compared with the last memory access value stored in register 9. The outputs of the comparators are then multiplied by user specified in-page weightings to give N in-page metrics, one for each thread. Each in-page weighting is an 8-bit unsigned vector which gives an in-page metric of the same size.

This per-thread in-page weighting allows the in-page effect of each thread to be independently fine-tuned. It also gives a flexibility, for example establishing relative thread priorities by assigning different values to each thread, when requests of all threads are in-page.

Figure 4:
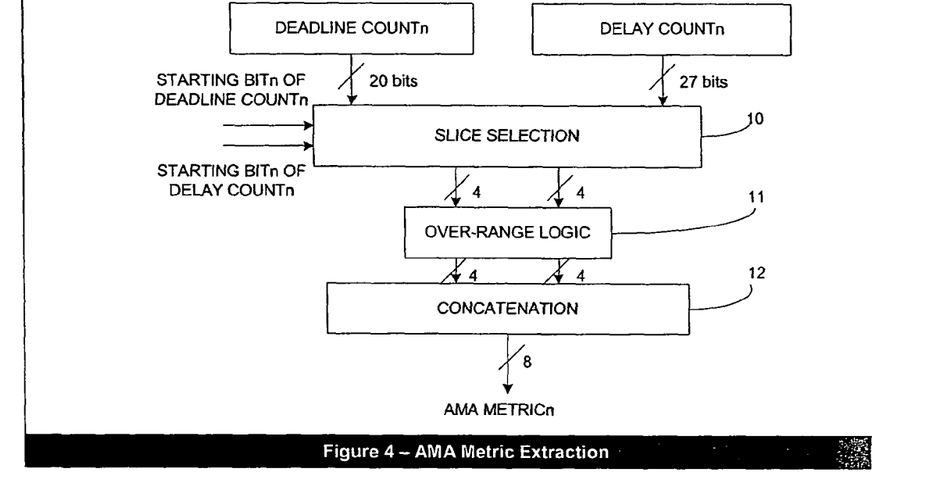
FIG. 4 shows schematically the implementation of the AMA extraction block for a thread for use in an embodiment of the invention.

The AMA extraction block for one of the threads is shown in FIG. 4. The object of this block is to produce an 8-bit output vector per thread in this particular embodiment although different outputs may be appropriate in other embodiments. This 8-bit output vector should reflect the current AMA status of the threads. In AMA, the thread ranking algorithm is based on comparing the overall metric of the threads. This is a concatenation of DEADLINE COUNT, the time when the thread must be executed, DELAY COUNT, the delay since the execution of the thread was first requested, and the priority given to the thread. The DEADLINE COUNT is the most important of these metrics. Therefore one reasonable form of AMA metrics to use for this block is a concatenation of DEADLINE COUNT and DELAY COUNT with DEADLINE COUNT being more significant.

If the whole length of the two count values is used then quite stringent timing requirements will be imposed on the hardware in the following stages of the prearbiter. For example, the adders and comparators will have to work harder. In order to relieve this timing requirement whilst still allowing an acceptable usable range of sensitivity of the prearbiter to the AMA status, a bit slice of length 4, for example, from each of the DEADLINE and DELAY COUNT is taken by a slice selection unit 10. As can be seen from FIG. 4, the slices of 4-bits are taken from a 20-bit DEADLINE COUNT and a 27-bit DELAY COUNT in this particular example. Different sized slices could be used, particularly with different sized DELAY and DEADLINE counts. After this has been done the bits are passed to over range logic 11 which checks to ensure that the slices truly represent a scaled down version of their originals. For example, if the slice from bit 5 to bit 2 is taken with the original value being (MSB) xxxxx10000000(LSB), then the slice should be set to a maximum value of 1111 to indicate the value being over range at the top end. The over-range checking logic 11 performs this function. A similar process is performed on the DELAY COUNT slice. If the value is not over the range limit it will be passed through unchanged. After this, the two slices are concatenated by a concatenation unit 12 to produce the AMA metric for that thread.

Figure 5:
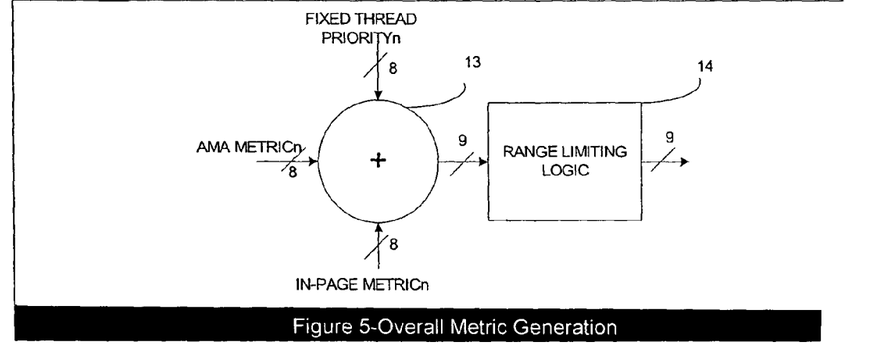
FIG. 5 shows an implementation of overall metric generation for a thread N in an embodiment of the invention.

FIG. 5 shows in more detail the overall metric generation unit 5 of FIG. 2. This comprises an adder 13 which receives three metric inputs. The first of these is an 8-bit fixed thread priority user-defined for the execution thread. The AMA metric and the in-page metric are the other two inputs. The output of the adder is 9 bits and is supplied to range limiting logic 14. All the 8-bit input vectors are unsigned as is the 9-bit output.

For each thread, a respective adder 13 adds the AMA and the in-page metrics explained above to the fixed user specified thread priority. The range-limiting logic then limits the sum to the maximum admissible value. The purpose of including the fixed thread priority is to enable the prearbiter to operate with a fixed thread priority scheme when AMA and/or in-page data is not being used.

The proposed overall thread priority metric above is suitable to be used for the thread decision because the higher this value, the higher the importance of the request would be considered by the arbitration logic. For example, a user may consider the memory latency performance to be important for a particular thread so that a large in-page weight is set, thereby producing a large overall metric when an in-page optimization opportunity arrives. This gives the request a high chance to be considered by the arbitration logic. In the context of AMA control, a higher value in the derived AMA metric would correspond to a thread that has been heavily under scheduled. This will allow the prearbiter to make sure the thread has high memory bandwidth to reduce the time needed by the AMA to revert to its normal scheduling, thus reducing the chance of other thread's AMA counts being saturated during this balancing period.

With an arbitration scheme based on an overall metric as discussed above, it is crucial that in both the situations that none of the execution threads are requesting and that at least one execution thread is requesting, a sensibly and functionally correct cycle by cycle decision is generated. It is also crucial that in a situation where at least two execution threads have the same metric, the prearbiter should give equal shares of memory bandwidth to each of the threads, for example by using a round robin arbitration scheme.

Figure 6:
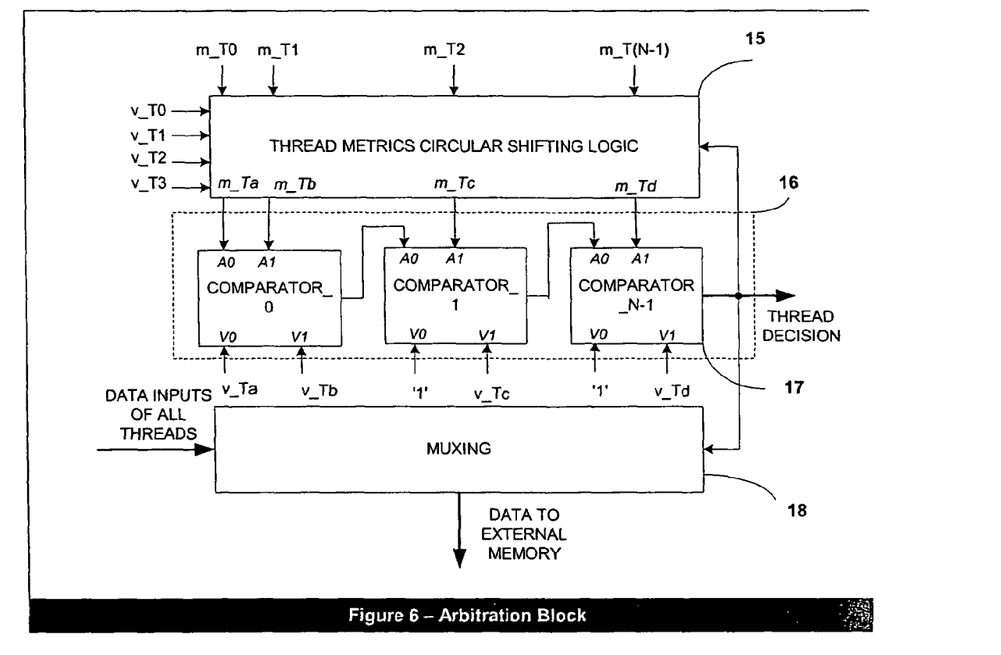
FIG. 6 shows schematically the arbitration block in an embodiment of the invention.
Figure 7:
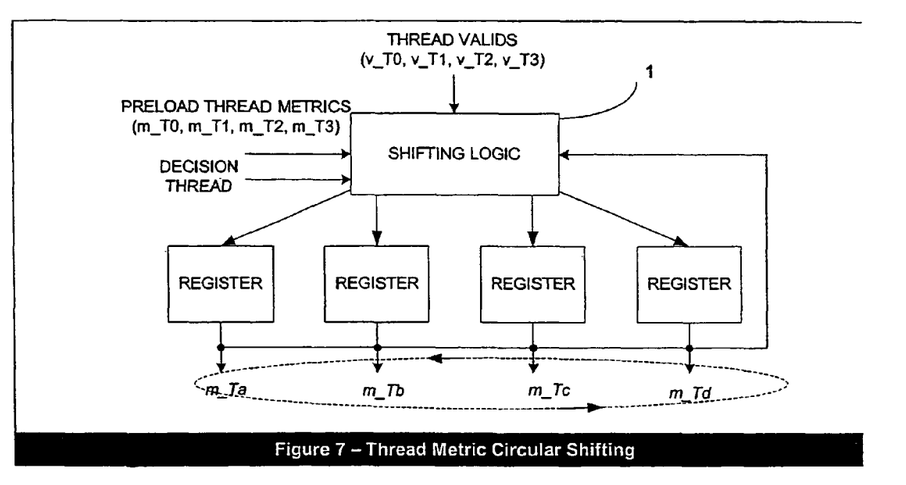
FIG. 7 shows re-ordering of thread metrics in an embodiment of the invention.

FIG. 6 illustrates the structure of arbitration logic 6 of the prearbiter in FIG. 2. Inputs to this block are m_T0, m_T1, m_T2 and m_T3, where m_T0 is the overall metric of thread 0 and v_T0, v_T1, v_T2, v_T3, where a '1' on v_T0 indicates m_T0 is valid. In order to understand how FIG. 6 operates, the operation of the sub-blocks is described first.

The function of the re-ordering logic 15 is to assign each pair of the four inputs m_T0(v_T0) . . . m_T3 (v_T3) to different output locations on every clock cycle. For example, on current cycle:

m_Ta=m_T0,m_Tb=m_T1,m_Tc=m_T2,
m_Td=m_T3 v_Ta=v_T0,v_Tb=v_T1,v_Tc=v_T2,v_Td=v_T3

On the next cycle:

m_Ta=m_T1,m_Tb=m_T2,m_Tc=m_T3, m_Td=m_T0 v_Ta=v_T1,v_Tb=v_T2,v_Tc=v_T3,v_Td=v_T0

The purpose of this shifting and the rule which it is based upon will become apparent later on in the discussion.

The function of the comparator block 16 is to decide the highest overall metric amongst m_Ta, m_Tb, m_Tc and m_Td given their validity by v_Ta . . . v_Td, and output its corresponding thread number to be the "thread decision". The truth table of the single comparator 17 in FIG. 6 is given below. A0 and A1 are the two data inputs to be compared, and V0 and V1 are the valids. OUTPUT contains A0 or A1, depending on which is bigger in size.

| A0, A1  | V0 | V1 | OUTPUT     |
|---------|----|----|------------|
| A0 = A1 | 0  | 0  | A0(lowest) |
| A0 = A1 | 0  | 1  | A1         |
| A0 = A1 | 1  | 0  | A0         |
| A0 = A1 | 1  | 1  | A0(lowest) |
| A0 < A1 | 0  | 0  | A0(lowest) |
| A0 < A1 | 0  | 1  | A1         |
| A0 < A1 | 1  | 0  | A0         |
| A0 < A1 | 1  | 1  | A1         |
| A0 > A1 | 0  | 0  | A0(lowest) |
| A0 > A1 | 0  | 1  | A1         |
| A0 > A1 | 1  | 0  | A0         |
| A0 > A1 | 1  | 1  | A0         |

From the table it can be seen that the rows marked in BOLD have only one definite output. For example in the second column, comparing a valid A1 with an invalid A0 must produce an output of A1. The other rows not marked in BOLD represent situations that neither execution thread is requesting or that the two metrics are the same. It follows that these outputs could be assigned arbitrarily. In this embodiment, A0 would always be assigned as the output.

With this scheme, it can be seen that if the re-ordering logic is by-passed (i.e., m_Ta=m_T0 . . . etc.) and all the threads at the input of the comparator block 16 in FIG. 6 are requesting with the same metric for some period of time, the thread 0 will always be granted an access. This contravenes the equal bandwidth share requirement discussed above. This is why shifting is necessary and it should be done such that for these tie-break situations, equal share of the memory bandwidth is provided.

A final hardware block in FIG. 6, which is a muxing unit 18, is used to connect the data and control inputs of the decision thread to the external memory as required. It receives the data inputs and connects these to the external memory. This is all done under the control of the thread decision outputted at the comparator block 16.

The description above shows methods by which the thread priorities can be dynamically changed. Others are clearly possible. Whatever the metrics are, these metrics can then be used individually or in combination with other metrics to produce a dynamic priority. For example, this system could use only the deadline count in numbers of clock cycles for the access of each thread. In such a situation, the closer the access is to the deadline whilst still waiting to be granted, the higher the priority would be for that thread. The deadline settings can of course be changed at any time by a register to reflect the changes on the load of threads to ensure that all threads have time to complete an execution.

The method described in generating an overall thread deciding the metric that represents a user specified combination of the fixed and dynamic priority aspects of the input streams could be applied to any kind of arbiter. In this particular application it is shown as a memory pre-arbiter. The implementation allows the arbitration scheme to be based on round robin, in-page optimization, and AMA status alone or on a scale or mixture of all three giving it much flexibility.

The invention claimed is:

1. A method of dynamically allocating access to a memory of a multithreaded processor, comprising the steps of:
   configuring a multithreaded processor to execute more than one thread simultaneously;
   requesting memory access from the more than one thread;
   deriving an automatic Microprocessor without Interlocked Pipeline Stages (MIPS) allocation (AMA) metric for each thread of the more than one thread from execution metrics for said each thread;
   deriving an in-page metric for said each thread from a page address of a last memory access and an in-page address required for an executing thread;
   determining the access to the memory based on the AMA metric and the in-page metric;
   wherein the page address of the last memory access is stored in a register and compared with the in-page address for the executing thread to derive the in-page metric;
   wherein the in-page metric is used to optimize a memory latency; and
   wherein the AMA metric is derived by the steps of taking a bit slice from each of two or more execution metrics and combining the bit slices to derive the AMA metric.

2. The method according to claim 1, further including the steps of passing each bit slice, using passing means for the bit slice, through an over-range checking logic and setting a value to a maximum, if the bit slice is over-ranged.

3. The method according to claim 2, further including the step of combining the in-page metric with a user defined priority for each thread.

4. The method according to claim 3, further including the step of providing an equal access to the resource from two or more threads with equivalent overall metrics.

5. The method according to claim 1, wherein the AMA metric is based on a deadline by which a thread must be executed.

6. The method according to claim 1, wherein the AMA metric is based on a delay since an execution of a thread has been requested.

7. A computer for dynamically allocating an access to a memory of a multi-threaded processor, comprising:
   the multi-threaded processor to execute more than one thread simultaneously;
   means configured to derive an automatic Microprocessor without Interlocked Pipeline Stages MIPS allocation (AMA) metric for each thread from execution metrics for that thread;
   means configured to derive an in-page metric for each thread from a page address of a last memory access and an in-page address required for an executing thread;
   means configured to determine the access to the memory and other resources for each thread, depending on the AMA metric and the in-page metric;
   wherein the page address of the last memory access is stored in a register and compared with the in-page address for the executing thread to derive the in-page metric;
   wherein the in-page metric is used to optimize a memory latency; and
   wherein the AMA metric is derived by the steps of taking a bit slice from each of two or more execution metrics and combining the bit slices to derive the AMA metric.

* * * * *